March 12, 1963 H. D. PIERSMA 3,080,760
DISPOSABLE SAMPLE PROBE FOR BULK CHEMICALS
Filed June 29, 1960

INVENTOR.
HENRY DIRK PIERSMA
BY
Samuel Branch Walker
ATTORNEY

United States Patent Office 3,080,760
Patented Mar. 12, 1963

3,080,760
DISPOSABLE SAMPLE PROBE FOR BULK
CHEMICALS
Henry Dirk Piersma, Wyckoff, N.J., assignor to American
Cyanamid Company, New York, N.Y., a corporation
of Maine
Filed June 29, 1960, Ser. No. 39,581
3 Claims. (Cl. 73—425.2)

This invention relates to a sample probe for powders, pastes and thick liquids having a slightly tapered, frusto-conical, apertured, outer shell and a rotatable, matching, cooperating, inner, tapered sample holder having a plurality of separate sample compartments arranged in staggered relationship with the apertures of the outer shell. In a preferred embodiment, the shell and holder are each of a transparent, molded plastic for single disposable use, and the entire assembly is aseptically stored in a protective tube.

Grain probes or sample thief tubes have been used for taking samples of grain. A long tubular shell having apertures therein has an inner mating tube with apertures which can be caused to match so that the grain probe may be shoved into the shipment of grain, the inner tube rotated to first align the apertures to permit grain to flow into the interior of the sampler, then rotated to close off the apertures, after which the sample probe is removed, the apertures again aligned and the sample of grain poured out. One such device is shown in a patent to A. M. Wiswell, Grain Sampler, 1,256,413, February 12, 1918.

Such devices are satisfactory for grain and other free-flowing fungible commodities.

For bulk chemicals, which may be powders which tend to cake, or hygroscopic materials, pastes or thick liquids, such sample thief tubes may retain an undesirably large portion of the sample, may become extremely difficult to clean, and may transfer contaminating materials to or from the product to be sampled.

It has now been found that a sample probe adapted for single use, disposable sampling has many advantages. Such a probe may be made of transparent plastic, which permits the inspection of the contents of sample compartments to see if the compartments have been filled and to observe stratification or uneven characteristics of the sample. By using a low cost, transparent plastic the sample probes may be economically used but once. This permits the use of sample probes in such materials as dyes. With dyes, it is obvious that a small quantity of a red dye would be very undesirable in a white pigment or blue dye, etc. The risk of transferring a small quantity from one sampled container to another is obviated when the probe is used but once. Additionally, certain materials to be sampled, particularly in pharmaceutical laboratories, must be sterile and need to be sampled without compromise of sterility. Particularly in the pharmaceutical field, the sampled materials may have an extremely high unit value so that a minimum sample is desired to avoid the necessity for returning the unused portion of the sample to the bulk material, or the loss of an expensive portion.

Particularly with heavy pastes or thick liquids, the transfer of a portion of the sample from the sample probe to a container for transportation is impractical and, therefore, it becomes desirable to use a disposable probe which serves both as the sample probe for snatching the sample and as container for the transportation of the sample to the analytical laboratory. A suitable device for giving satisfactory solutions to the above-presented problems, and which has other advantages more particularly pointed out in connection with the disclosure and with the claims, is shown in the present disposable sample probe, one embodiment of which is illustrated in the accompanying drawings.

Figure 1:
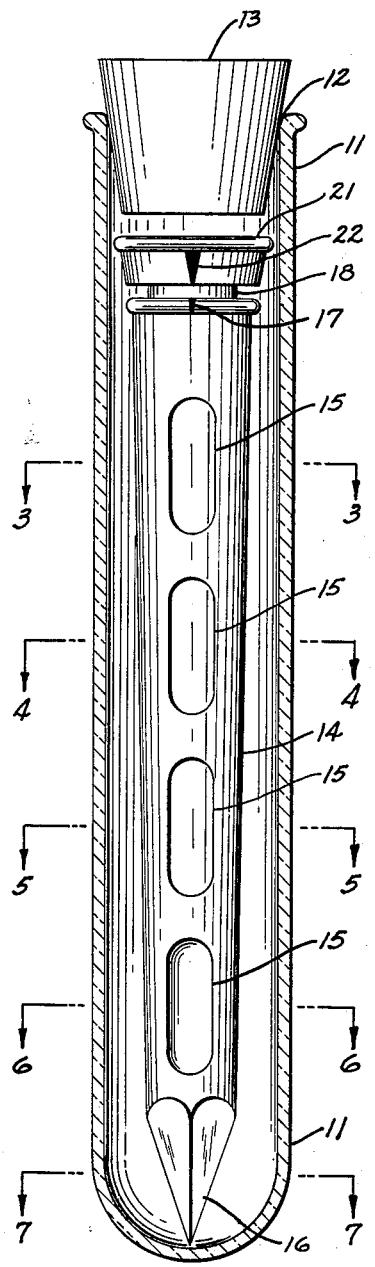
FIGURE 1 is a view, in partial section, of the sample probe aseptically packed in a container.
Figure 2:
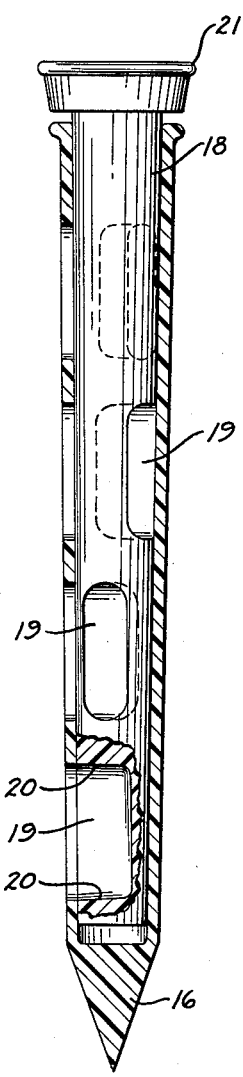
FIGURE 2 is a view, in partial section, at right angles to the view of FIGURE 1, showing the interior construction of the sample probe.
Figure 3:
FIGURE 3 is a section at 3—3 of FIGURE 1, showing a cross section of the sample probe.
Figure 4:
FIGURE 4 is a similar view at section 4—4 of FIGURE 1.
Figure 5:
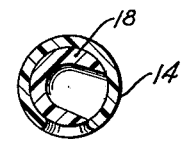
FIGURE 5 is a similar view at section 5—5 of FIGURE 1.
Figure 6:
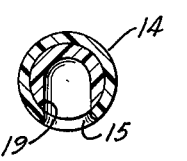
FIGURE 6 is a similar view at section 6—6 of FIGURE 1, showing a sample compartment in registration with a loading aperture for the loading of a particular sample compartment.
Figure 7:
FIGURE 7 is a section at 7—7 of FIGURE 1, showing the triangular shape of the penetrating point of the sample probe.

In FIGURE 1 is shown a container 11 which may be of plastic or glass to hold the sample probe. Metal containers are useful in the larger sizes. For a small size probe, the container may conveniently be a glass test tube. The container, at the open end 12, has inserted therein a stopper 13 or other closure. A rubber or cork stopper in a glass test tube furnishes a convenient closure in which the sample probe may be stored until ready for use. Conventional sterile techniques are used to open and close the container without compromising sterility. For instance, paper shields or cotton wrappings or sterile boxes may be used as conventional techniques.

Inside the container is the probe itself. The outer shell 14 of the probe is preferably of a transparent plastic material such as polystyrene, polymethylstyrene, polymethacrylate, polyethylene, preferably linear, polypropylene, or other of the conventional transparent or translucent dimensionally stable plastics. Along one side of the shell are a plurality of sample apertures 15. These apertures are preferably elongated and cover less than one fifth of the periphery of the sample probe. Conveniently, these apertures may have rounded corners. A total of four such apertures is shown in the drawings, although a larger or smaller number may be used. One end of the outer shell is closed to form a penetrating point 16. Preferably, the penetrating point is of polyhedral configuration. Conveniently, three flat sides form the point so that the point may be easily pushed through caked materials and, by twisting of the probe, the penetrating point has a drilling action. The other end of the shell is open and has an index mark 17 thereon to indicate the axis of the sample apertures when these apertures are concealed in a sampled material.

Prior art probes have been tubular. In distinction thereto, the present probe has a taper so that the outer shell itself is of frusto-conical configuration. A taper of from 0.002 inch per inch to at least 0.01 inch per inch gives sufficient draft that the outer shell of the probe may be conveniently molded. It is extremely difficult to mold a truly cylindrical tube of any length as the mandrel on which the tube is formed binds during extraction of the mandrel from the shell. By having the outer shell tapered, it is practical to mold the shell of a plastic economically, and of accurately sized configuration to permit interchange of sample holders 18.

The sample holder 18 is also preferably of the same type of plastic as is the outer shell and is of a slightly tapered frusto-conical outer configuration of a size to match the interior of the outer shell and be rotatable therein. Preferably, the size is such that there is no appreciable leakage between the sample holder and the outer shell. The sample holder has therein a plurality of sample compartments 19. These sample holders are spaced longitudinally along the sample holder so that one such sample compartment matches each sample aperture longitudinally. The sample compartments are staggered circumferentially so that a small number of the sample compartments, preferably only one, is in matching relationship with a sample aperture at a given time. By staggering the sample compartments circumferentially and having the sample apertures covering a radial angle of not greater than 72° (one-fifth of a circle) and preferably of from about 20° to 50°, at least four sample compartments spaced 72° circumferentially may be used with one sample compartment being filled through a sample aperture at one time. In the fifth position, all compartments are closed. As shown in FIGURES 3 to 6, separate sample compartments may be used in different directions at an angle of 72° and each one filled in turn through a sample aperture. Conveniently, the sample compartments are of rounded configuration with slightly tapered walls 20 of the sample compartment so that the sample holder may be molded with inserts to form the sample compartments, which inserts may be withdrawn during the molding operation. The ease of molding markedly reduces the cost of the sample probe. The sample holder is tapered to fit the interior of the shell and has a handle 21 extending above the upper end of the outer shell. The holder has a handle index 22, conveniently aligned with the last sample compartment, to indicate the relative angular position of the sample holder and the outer shell.

Preferably, the sample compartments are of the same size so that the contents of each sample compartment are the same size, which permits mixing of the contents of the various compartments to give a proportionate sample along the length of the sample probe.

Where sampling theory dictates a larger or a smaller sample to be taken at particular locations, so as to give a composite sample which is proportional to any desired variable, the sample compartments may be modified in size to fit such sample theory. There is much theory on the selection of quantities and types of samples at particular points to give samples representative of an entire mass.

Because both the sample holder and the outer shell may be conveniently formed by molding, in comparatively simple molds, the present probe may be constructed so economically that the probe may be replaced at less cost than would be required to disassemble and wash the parts, even though the parts themselves are rounded and are comparatively easily cleansed.

In sampling, thick liquids, pastes or powders may be kept in the sample compartments until ready for analysis, particularly if all compartments can be closed. The apertures can be small enough that one aperture is closed before the next is opened. Separate analysis may be run on the contents of each sample compartment as a check for homogeneity of the material being sampled. With provisions for separate analysis of the contents of each compartment, and with the contents being visible to permit a visible inspection for homogeneity, more revealing samples are obtainable and the value of the sampling is enhanced.

The sample holder and the outer shell may be assembled in the container and sterilized by a sterilizing gas, or the stopper may be inserted and the assembly sterilized by heat, or radiation, for those instances in which it is desirable to be able to snatch a sample without compromising the sterility of either the sample or the main batch of material.

I claim:

1. A sample probe comprising: a frusto-conical outer shell having apertures therein and an index mark at the larger open end, and a multi-sided penetrating point at the smaller closed end; and closely fitting in said shell a one-piece, solid, rotatable, matching, cooperating, inner, sample holder having separate, uniform-sized sample compartments which taper inwardly so that solid contents are readily discharged, which holder can be turned so that the compartments match the apertures in the outer shell, one at a time, and an integral handle at the upper end of said holder, and a handle index on said handle, said assembly being transparent.

2. A sample probe comprising: a frusto-conical outer shell having apertures therein and an index mark at the larger open end, and a multi-sided penetrating point at the smaller closed end; and closely fitting in said shell a one-piece, solid, rotatable, matching, cooperating, inner, sample holder having separate, uniform-sized sample compartments which taper inwardly so that solid contents are readily discharged, which holder can be turned so that the compartments match the apertures in the outer shell, and an integral handle at the upper end of said holder, and a handle index on said handle.

3. A sterile sample probe for sterilely removing samples without compromising the sterility of the sample or the bulk material comprising: a probe assembly consisting of a frusto-conical outer shell having axially and radially spaced apertures therein and an index mark at the larger open end, and a multi-sided penetrating point at the smaller closed end; and closely fitting in said shell a one-piece, solid, rotatable, matching, cooperating, inner, sample holder having separate, uniform-sized sample compartments which taper inwardly so that solid contents are readily discharged, which holder can be turned so that the compartments match the apertures in the outer shell, one at a time, and each compartment is closed serially, so that one compartment at a time is filled, and an integral handle at the upper end of said holder, and a handle index on said handle, said assembly being transparent; and an outer container, and a stopper therefor, the said assembly and the interior of said container being sterile.

References Cited in the file of this patent

UNITED STATES PATENTS

| 1,060,493 | Reed | Apr. 29, 1913 |
| 1,109,446 | Melberg | Sept. 1, 1914 |
| 1,256,413 | Wiswell | Feb. 12, 1918 |
| 2,688,877 | Peine | Sept. 14, 1954 |
| 2,830,738 | Sorg et al. | Apr. 15, 1958 |

FOREIGN PATENTS

| 60,440 | France | Apr. 21, 1954 |

(Addition to No. 1,012,874)